US012723622B2

(12) United States Patent
Chollet et al.

(10) Patent No.: US 12,723,622 B2
(45) Date of Patent: Sep. 1, 2026

(54) BEARING DEVICE WITH INTEGRATED ELECTRICAL INSULATION, NOTABLY FOR AN ELECTRIC MOTOR OR MACHINE

(71) Applicant: AKTIEBOLAGET SKF, Gothenburg (SE)

(72) Inventors: Mickael Chollet, Joué-lès-Tours (FR); Anthony Simonin, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/081,200

(22) Filed: Mar. 17, 2025

(65) Prior Publication Data

US 2025/0297642 A1 Sep. 25, 2025

(51) Int. Cl.
*F16C 19/06* (2006.01)
*F16C 19/52* (2006.01)
(Continued)

(52) U.S. Cl.
CPC .............. *F16C 19/52* (2013.01); *F16C 19/06* (2013.01); *F16C 33/586* (2013.01);
(Continued)

(58) Field of Classification Search
CPC ........ F16C 19/06; F16C 19/52; F16C 27/066; F16C 33/586; F16C 35/077; F16C 2202/30; F16C 2226/70; F16C 2380/26; H02K 5/173; H02K 5/1732; H02K 5/1735; H02K 5/1737
See application file for complete search history.

(56) References Cited

U.S. PATENT DOCUMENTS 1,329,720 A * 2/1920 Meier .................... H02K 5/173
384/462
2,283,839 A * 5/1942 Wright ................. H02K 5/1732
384/536

(Continued)

FOREIGN PATENT DOCUMENTS

DE 102019104702 A1 8/2020
DE 102020106338 A1 * 9/2021 .............. F16C 19/06

(Continued)

OTHER PUBLICATIONS

Preliminary Search Report from the French Patent Office dated Nov. 18, 2024 in related French application No. FR2402856, including Search Report and Written Opinion.

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A bearing device includes a bearing and a bushing. The bearing has first and second rings, and the bushing has a first axial end and a second axial end and an axial length from the first axial end to the second axial end and a first radial surface and a second radial surface radially spaced from the first radial surface. An electrically insulating insert is overmolded between and connects the first radial surface of the bushing and a cylindrical surface of the second ring. The first radial surface of the bushing is curved but does not lie on a single cylinder.

14 Claims, 4 Drawing Sheets

(51) Int. Cl.
*F16C 33/58* (2006.01)
*F16C 35/077* (2006.01)
*H02K 5/173* (2006.01)

(52) U.S. Cl.
CPC ........... *F16C 35/077* (2013.01); *H02K 5/173* (2013.01); *F16C 2202/30* (2013.01); *F16C 2226/70* (2013.01); *F16C 2380/26* (2013.01)

(56) References Cited

U.S. PATENT DOCUMENTS

| | | | |
|---|---|---|---|
| 5,733,120 | A | 3/1998 | Yao et al. |
| 11,002,315 | B2 * | 5/2021 | Stephan .................. F16C 33/60 |
| 12,104,650 | B2 | 10/2024 | Arnault et al. |
| 12,173,754 | B2 | 12/2024 | Arnault et al. |
| 12,196,263 | B2 | 1/2025 | Arnault et al. |
| 12,196,266 | B2 | 1/2025 | Chollet |
| 2014/0270616 | A1 | 9/2014 | Umemoto et al. |
| 2015/0155754 | A1 | 6/2015 | Ohashi et al. |
| 2023/0220874 | A1 | 7/2023 | Arnault et al. |
| 2023/0220881 | A1 | 7/2023 | Arnault et al. |
| 2023/0220882 | A1 | 7/2023 | Arnault et al. |
| 2023/0223813 | A1 | 7/2023 | Arnault et al. |

FOREIGN PATENT DOCUMENTS

| | | | |
|---|---|---|---|
| DE | 102020114264 | A1 | 12/2021 |
| DE | 102021109281 | A1 | 10/2022 |
| FR | 3156173 | A1 | 6/2025 |

OTHER PUBLICATIONS

Unpublished U.S. Appl. No. 19/081,186, first named inventor: Mickael Chollet, filed Mar. 17, 2025.

Unpublished U.S. Appl. No. 19/068,314, first named inventor: Benoit Arnault, filed Mar. 3, 2025.

Unpublished U.S. Appl. No. 19/068,333, first named inventor: Benoit Arnault, filed Mar. 3, 2025.

* cited by examiner

BEARING DEVICE WITH INTEGRATED ELECTRICAL INSULATION, NOTABLY FOR AN ELECTRIC MOTOR OR MACHINE

CROSS-REFERENCE

This application claims priority to French patent application no. 2402856 filed on Mar. 22, 2024, the contents of which are fully incorporated herein by reference.

TECHNOLOGICAL FIELD

The present disclosure relates to the field of bearings that are particularly used in electric motors, electric machines and associated equipment.

BACKGROUND

In an electric motor or machine, at least one rolling bearing is mounted between the housing of the electric motor or machine and the rotary shaft in order to support this shaft. During operation, when the shaft is rotating, a difference in electrical potential can occur between the shaft and the housing of the electric motor or machine, thereby generating an electric current between the inner ring of the rolling bearing, which is rigidly connected to the shaft, and the outer ring, which is rigidly connected to the housing. The electric current flowing through the components of the rolling bearing can damage these components, notably the rolling elements and raceways provided on the inner and outer rings. Electrical discharges can also generate vibrations.

In order to overcome these disadvantages, a known solution involves replacing the rolling elements of the bearing, which are made from the same steel as the inner and outer rings, with rolling elements made of ceramic. These are generally referred to as hybrid rolling bearings. However, such a hybrid rolling bearing is relatively expensive.

In order to overcome the aforementioned disadvantages, another known solution involves equipping the outer ring of the rolling bearing with an insulating sleeve provided with a bushing and an insulating insert made of electrically insulating material and radially interposed between the outer ring and the bushing. In order to attach the insulating insert to the outer ring and to the bushing without any additional elements or specific machining on the outer ring, the insulating insert can be overmolded. However, with such a solution, relative uncoupling of the insulating insert and of the bushing can occur during operation.

SUMMARY

Therefore, an aspect of the present disclosure is to overcome the aforementioned disadvantages by providing a bearing device with a simple and economical design.

The device relates to a bearing device comprising a bearing provided with a first ring and a second ring that are able to rotate relative to one another. The device further includes at least one insulating sleeve mounted on the second ring of the bearing. The insulating sleeve has a bushing and an insulating insert radially interposed between the second ring of the bearing and the bushing. The insulating insert is made of electrically insulating material.

The bushing comprises an annular outer surface and an annular inner surface opposite the outer surface. The insulating insert is overmolded onto the second ring of the bearing and at least onto one of the outer and inner surfaces of the bushing.

According to a general feature, the inner or outer surface of the bushing radially oriented towards the second ring assumes a non-cylindrical annular shape. This provides a bearing device with integrated electrical insulation that is economical compared with conventional hybrid rolling bearings. Furthermore, the device is easy to manufacture and assemble into the associated electric motor or machine.

Furthermore, providing the non-cylindrical annular shape on the inner or outer surface of the bushing allows a good connection to be obtained with the insulating insert insofar as a matching non-cylindrical annular shape is obtained on the insert during the overmolding. The risk of any relative movements between the insulating insert and the bushing in the circumferential direction is particularly limited, notably during temperature variations.

"Circumferential direction" is understood to mean the direction that is perpendicular both to the axial direction and to a radius of the bearing device, in other words, tangent to a circle whose center is on the axis of the bearing device. "Axial direction" is understood to mean the direction parallel to the axis of the bearing device. "Annular surface" is understood to mean a surface which, in a sectional view, forms a convex flat curve that is closed on itself.

The other outer or inner surface of the bushing radially oriented on the side opposite the second ring has a cylindrical annular shape.

The inner or outer surface of the bushing can have, in a sectional view, two axes of orthogonal symmetry.

According to a first design, the inner or outer surface of the bushing has, in a sectional view, an oblong shape. In this case, the inner or outer surface of the bushing can be provided with two diametrically opposite cylinder portions with different axes, and with two rectilinear portions connecting the cylinder portions to one another. Advantageously, the cylinder portions can be two semi-cylindrical portions.

According to a second design, the inner or outer surface of the bushing has, in a sectional view, an oval shape. In this case, the inner or outer surface of the bushing can be provided with two first diametrically opposite cylinder portions with different axes, and with two second cylinder portions connecting the first cylinder portions to one another and with different axes.

The bushing can be provided with two front faces delimiting its axial length. The projection can radially extend one of the front faces. In a particular embodiment, the bushing is made of metal material. The bushing thus can be easily machined to a predetermined radial tolerance.

According to a first design, the bushing delimits the outer surface of the device. In this case, the second ring is the outer ring of the bearing. According to a second alternative design, the bushing delimits the inner surface of the device. In this case, the second ring is the inner ring of the bearing.

If the insulating insert is made of synthetic or elastomer material, it makes the device insensitive to temperature variations.

In a particular embodiment, the bearing comprises at least one row of rolling elements disposed between raceways of the first and second rings. The rolling elements can be made of metal material.

The disclosure also relates to an electric motor comprising a housing, a shaft and at least one bearing device as defined above and radially mounted between the housing and the shaft.

BRIEF DESCRIPTION OF THE DRAWINGS

The present invention will be better understood with reference to the detailed description of embodiments, which are provided by way of non-limiting examples and are illustrated by the appended drawings, in which.

DETAILED DESCRIPTION

Figure 1:
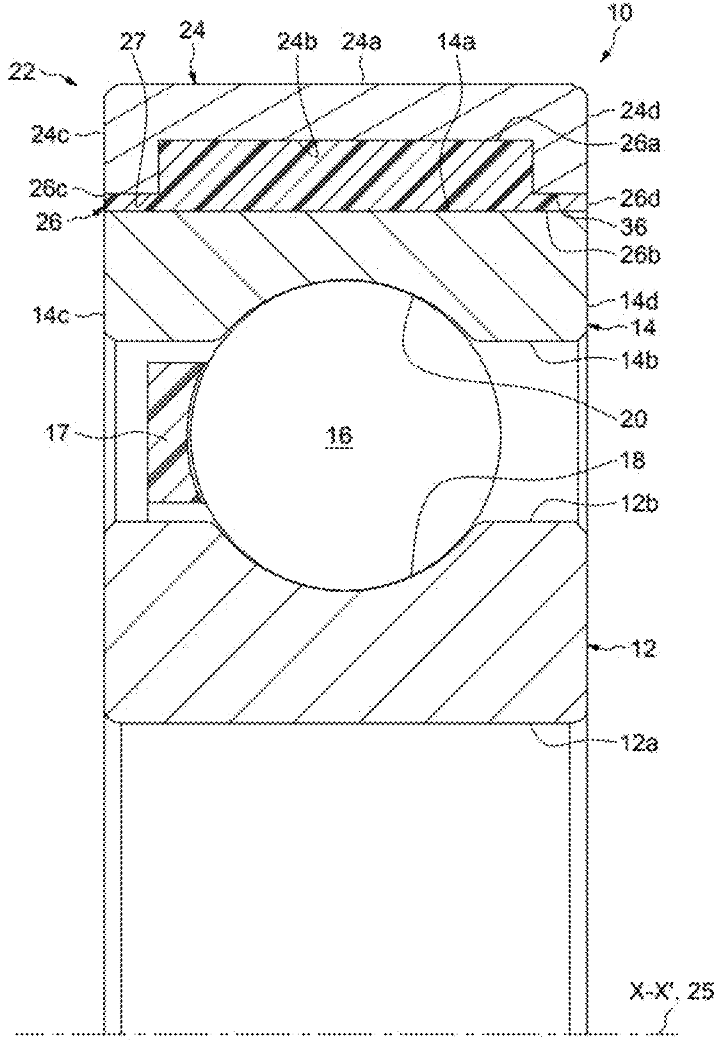
FIG. 1 is an axial sectional view of a portion of a bearing device according to one embodiment of the present disclosure.

The bearing device illustrated in FIG. 1 comprises a bearing 10 having a first ring 12 and a second ring 14 that are configured to rotate relative to each other about the X-X' axis of the bearing. In the illustrated embodiment, the first ring 12 is the inner ring of the bearing and the second ring 14 is the outer ring. The bearing device is configured such that it does not conduct electric currents. The bearing device has integrated electrical insulation.

The inner ring 12 and the outer 14 ring of the bearing are concentric and axially extend along the X-X' axis of the bearing. The inner and outer rings 12, 14 are made of steel. The rings are solid type rings.

In the illustrated embodiment, the bearing 10 also comprises a row of rolling elements 16, in this case balls, radially interposed between the inner 12 and outer 14 rings. The rolling elements 16 are made of steel. The bearing 10 also comprises a cage 17 for maintaining an even circumferential spacing of the rollers 16. The bearing 10 also can be equipped with sealing seals or flanges.

The inner ring 12 has a cylindrical bore 12*a*, a cylindrical axial outer surface 12*b* radially opposite the bore, and two opposite radial front faces (not referenced) axially delimiting the bore and the outer surface. The bore 12*a* and the outer surface 12*b* delimit the radial thickness of the inner ring 12. The bore 12*a* forms the inner surface of the inner ring. The inner ring 12 also has an inner raceway 18 for the rolling elements 16 that is formed on the outer surface 12*b*. The raceway 18 is directed radially outwards.

The outer ring 14 has a cylindrical axial outer surface 14*a*, a cylindrical bore 14*b* radially opposite the outer surface 14*a*, and two opposite radial front faces 14*c*, 14*d* axially delimiting the bore and the outer surface. The outer surface 14*a* and the bore 14*b* delimit the radial thickness of the outer ring 14. The outer ring 14 also comprises an outer raceway 20 for the rolling elements 16 that is formed on the bore 14*b*. The raceway 20 is directed radially inwards.

The bearing device also includes an electrically insulating sleeve 22 mounted on the outer ring 14. The insulating sleeve 22 is mounted on the outer surface 14*a* of the outer ring 14. The insulating sleeve 22 is rigidly connected to the outer ring 14. The insulating sleeve 22 comprises a bushing 24 and an insulating insert 26 radially interposed between the outer ring 14 and the bushing 24. The insulating insert 26 is overmolded onto the outer ring 14 and onto the bushing 24.

The bushing 24 is annular and extends axially. The bushing 24 is made as a single piece in this case. Alternatively, the bushing 24 could be made in multiple parts bearing against one another, for example, two identical parts. The bushing 24 comprises a cylindrical annular axial outer surface 24*a* the axis 25 of which is coaxial with the X-X' axis, and an annular inner surface 24*b* radially opposite the outer surface 24*a*. The annular inner surface 24*b* forms the inner surface of the bushing 24. The annular inner surface 24*b* is oriented radially inwards, i.e., towards the outer ring 14.

The bushing 24 also comprises two opposite radial front faces 24*c*, 24*d* axially delimiting the annular inner surface and the outer surface. The front faces 24*c*, 24*d* delimit the axial length of the bushing. The outer surface 24*a* and the annular inner surface 24*b* delimit the radial thickness of the bushing 24. The outer surface 24*a* of the bushing delimits the outer surface of the bearing device 10. In other words, the outer surface 24*a* defines the outer diameter of the bearing device 10.

Figure 3:
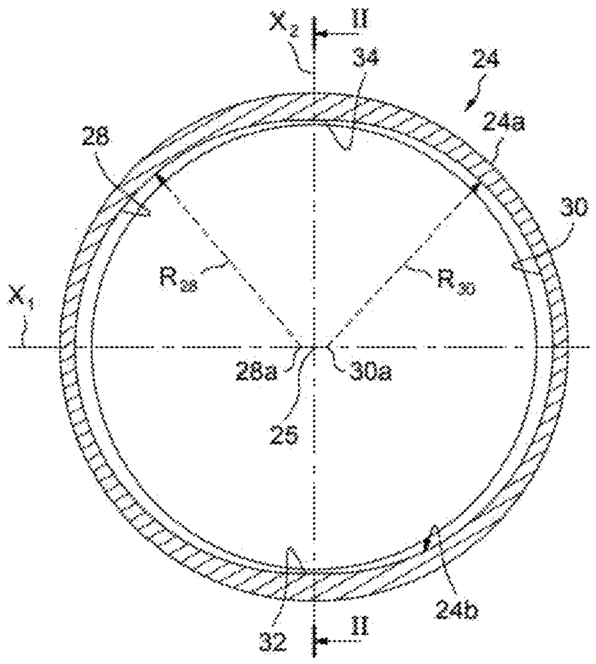
FIG. 3 is a sectional view along the III-III axis of FIG. 2.
Figure 4:
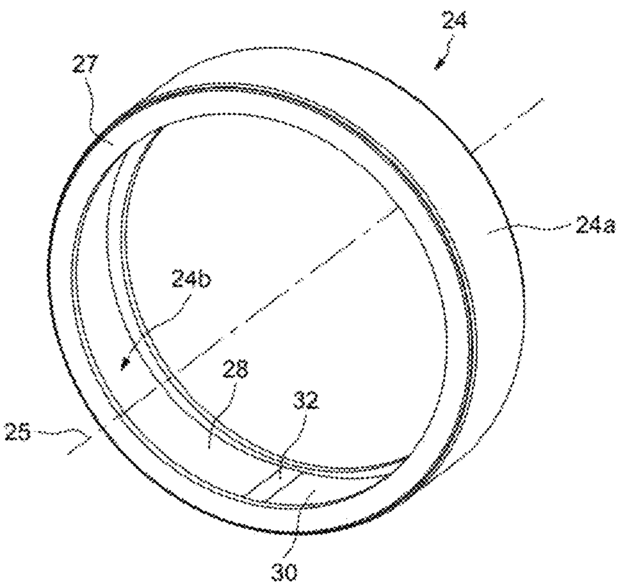
FIG. 4 is a perspective view of the bushing of FIG. 2.

The annular inner surface 24*b* of the bushing is non-cylindrical. As shown in FIGS. 3 and 4, in the illustrated embodiment, the bore 24*b* has first and second semi-cylindrical portions 28, 30 with different axes 28*a*, 30*a*, and with first and second rectilinear (planar) portions 32, 34 connecting the semi-cylindrical portions to one another. The first and second semi-cylindrical portions 28, 30 are diametrically opposite one another. The first and second rectilinear portions 32, 34 are diametrically opposite one another. The axes 28*a*, 30*a* are in the axial midplane of the bushing. The axes 28*a*, 30*a* are on either side of the axis 25 of the outer surface of the bushing. The radii R28 and R30 of the first and second semi-cylindrical portions 28, 30 are equal. Alternatively, the radii R28 and R30 of the first and second semi-cylindrical portions 28, 30 could be different.

The first rectilinear portion 32 connects a first end of the first semi-cylindrical portion 28 to a first end of the second semi-cylindrical portion 32, and the second rectilinear portion 34 connects a second end of the second semi-cylindrical portion 28 to a second end of the second semi-cylindrical portion 32. The first and second ends of each of the first and second semi-cylindrical portions 28, 30 delimit the semi-cylindrical portion in the circumferential direction. Each of the first and second rectilinear portion 32, 34 is circumferentially connected on one side to the first semi-cylindrical portion 28 and is circumferentially connected on the other side to the second semi-cylindrical portion 30. Each of the first and second rectilinear portion 32, 34 extends in the extension of the semi-cylindrical portions 28, 30 without a drop-off. The rectilinear portions 32, 34 are flat (planar).

In a sectional view, the annular inner surface 24*b* of the bushing has two axes X1, X2 of orthogonal symmetry. The annular inner surface 24*b* has, in a sectional view, an oblong shape.

Figure 2:
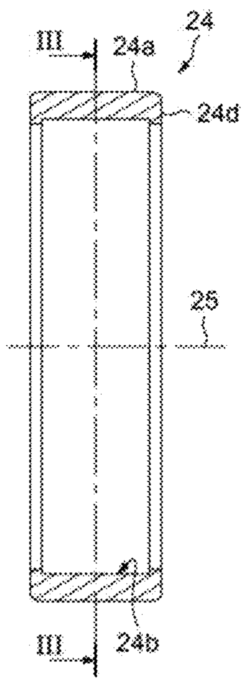
FIG. 2 is a sectional view of a bushing of the bearing device of FIG. 1.

As shown in FIGS. 1, 2 and 4, in the illustrated embodiment, the annular inner surface 24*b* of the bushing comprises a first radially inwardly extending annular band of material 27 that extends inwards, i.e., extends towards the outer ring 14. The first annular band of material 27 extends from the annular inner surface 24*b*. The first annular band of material 27 extends radially. The first annular band of material 27 is located at an axial end of the annular inner surface 24*b* of the bushing. The first annular band of material 27 extends radially inwards from the front face 24*c*. The outer face of the projection 27 is coplanar with the front face 24*c*.

A second annular band of material 36 extends radially inward from the annular inner surface 24*b* of the bushing, i.e., towards the outer ring 14. The second annular band of material 36 extends relative to the annular inner surface 24*b*. The second annular band of material 36 extends radially. The second annular band of material 36 extends the front face 24*d* of the bushing radially inwards. The outer face of the projection 36 is coplanar with the front face 24*d*.

In the illustrated embodiment, the second annular band of material 36 has a radial dimension equal to that of the first annular band of material 27. Alternatively, the second annular band of material 36 could have a radial dimension that is less than or greater than that of the first annular band of material 27. Alternatively, a projection 36 and/or a projection 27 may not be omitted.

In the illustrated embodiment, the non-cylindrical annular inner surface 24*b* extends over the entire width between the first and second annular bands of material 27, 36. Alternatively, the non-cylindrical annular inner surface 24*b* could be narrower and then extend via a cylindrical portion.

The bushing 24 is advantageously made of metal material. Thus, the outer surface 24*a* of the bushing can be easily machined to a predetermined tolerance if required. Preferably, the bushing 24 is made of steel. The bushing 24 can be obtained from a sheet metal panel by cutting, stamping and rolling. Alternatively, the bushing 24 can be obtained from a tube or from forged/rolled blanks, or even from sintering and stamping.

The insulating insert 26 is made of electrically insulating material. The insulating insert 26 can be made, for example, of synthetic material, such as PEEK or PA46, or it even can be made of elastomer material, such as rubber, for example.

The insulating insert 26 is radially interposed between the outer surface 14*a* of the outer ring and the annular inner surface 24*b* of the bushing. The insulating insert 26 covers the outer surface 14*a* of the outer ring. In this case, the insulating insert 26 completely covers the outer surface 14*a* in the axial and circumferential directions. The insulating insert 26 also covers the annular inner surface 24*b* of the bushing. The insulating insert 26 in this case also completely covers the annular inner surface 24*b* in the axial and circumferential directions. The insulating insert 26 also covers the first and second annular bands of material 27 and 36.

As indicated above, the insulating insert 26 is overmolded onto the outer ring 14 of the bearing and onto the bushing 24. The insulating insert 26 is overmolded onto the outer surface 14*a* of the outer ring 14, onto the annular inner surface 24*b* and onto the first and second annular bands of material 27, 36 of the bushing 24.

The insulating insert 26 is annular and extends axially. The insulating insert 26 has an axial outer surface 26*a*, a cylindrical bore 26*b* radially opposite the outer surface 26*a*, and two opposite radial front faces 26*c*, 26*d* axially delimiting the bore and the outer surface. The front faces 26*c*, 26*d* axially delimit the insulating insert 26. The outer surface 26*a* and the bore 26*b* delimit the radial thickness of the insulating insert 26. The outer surface 26*a* is in radial contact with the bore 24*b* of the bushing and with the projections 27, 36. The bore 26*b* is in radial contact with the outer surface 14*a* of the outer ring.

The shape of the outer surface 26*a* of the insulating insert matches that of the annular inner surface 24*b* of the bushing and of the first and second annular bands of material 27, 36, and thus assumes a stepped shape. In the area of the annular inner surface 24*b*, the outer surface 26*a* thus has two semi-cylindrical portions matching the semi-cylindrical portions 28, 30, and with two rectilinear portions matching the rectilinear portions 32, 34.

In the illustrated embodiment, the faces 14*c*, 26*c*, 24*c* and 14*d*, 26*d*, 24*d* of the outer ring, the insulating insert and the bushing are respectively coplanar.

Alternatively, other arrangements can be provided. For example, the insulating insert 26 could have a limited axial dimension and could remain axially set back from the faces 14*c*, 14*d* of the outer ring. Alternatively, the insulating insert 26 could have a greater axial dimension and axially project from the faces 14*c*, 14*d* of the outer ring. In this case, the insulating insert 26 can at least partly cover these faces 14*c*, 14*d*. As a variant, the insulating insert 26 could at least partly cover the faces 24*c*, 24*d* of the bushing.

In another alternative, or in combination, the bushing 24 could axially project from the insulating insert 26 relative to the faces 26*c* and 26*d*, or could remain axially set back from these faces.

The bearing device is manufactured as follows.

In a first step, the bearing 10 and the bushing 24 are mounted inside a mold that is provided for overmolding the insulating insert 26. In this position mounted inside the mold, the bushing 24 is radially spaced apart from the outer ring 14 of the bearing. Then, in a second subsequent step, the insulating insert 26 is overmolded both onto the outer ring 14 of the bearing and onto the bushing 24. Finally, the bearing device, which is in the form of a unitary assembly, is removed from the mold.

Figure 5:
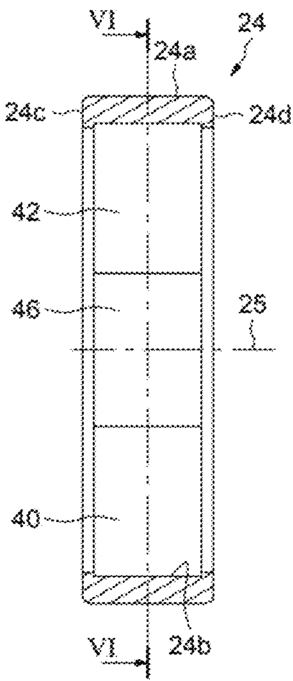
FIG. 5 is a sectional view of the bushing of a bearing device according to another embodiment of the present disclosure.
Figure 6:
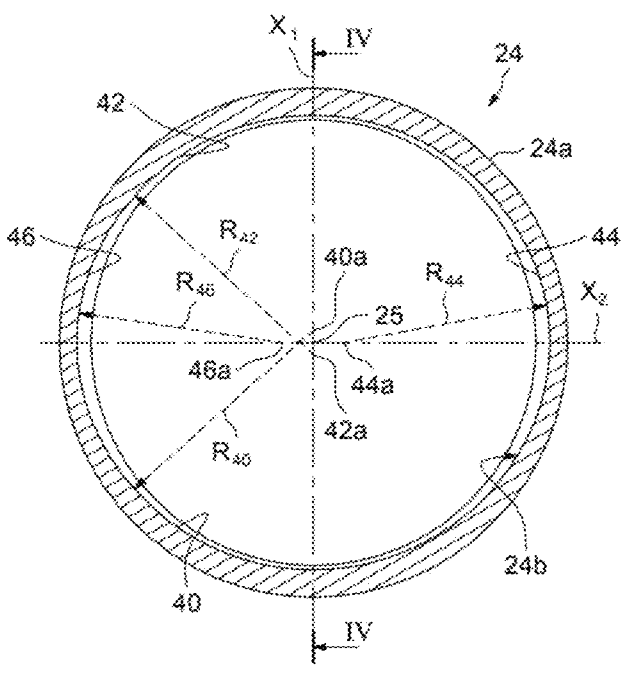
FIG. 6 is a sectional view along the VI-VI axis of FIG. 5.
Figure 7:
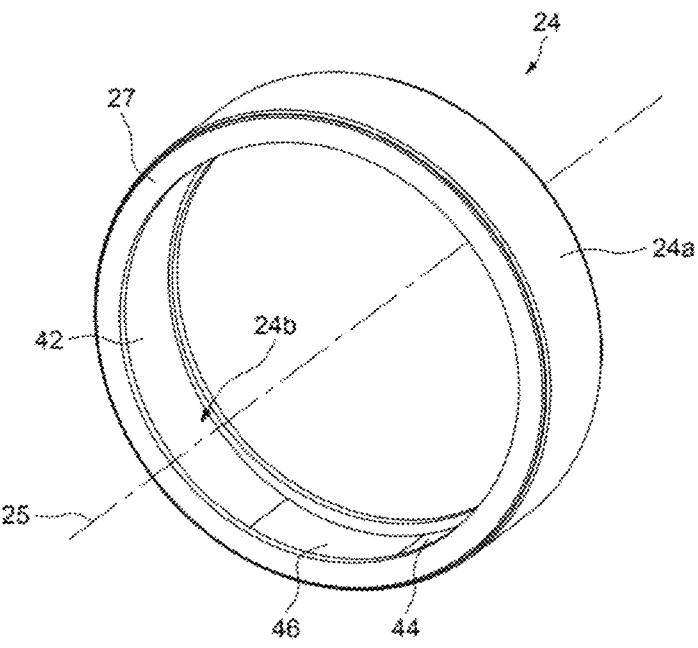
FIG. 7 is a perspective view of the bushing of FIG. 5.

In the embodiment illustrated in FIGS. 5 to 7, in which identical elements have the same references, the annular inner surface 24*b* of the bushing is also non-cylindrical, but in this case is provided with a first first cylindrical portion 40 having an axis 40*a* and a second first cylinder portions 42 having an axis 42*a*, and with a first second cylinder portions 44 having an axis 44*a* and a second second cylindrical portion 46 having an axis 46*a*. The first second cylinder portion 44 connects a first end of the first first cylinder portion 40 to a first end of the second first cylinder portion 44 and the second second cylinder portion connects a second end of the first first cylinder portion 40 to a second end of the second first cylindrical portion 44. The axes 44*a* and 46*a* are spaced apart. The first and second first cylinder portions 40, 42 are diametrically opposite one another. The first and second second cylinder portions 44, 46 are diametrically opposite one another.

The axes 40*a*, 42*a* are located in the radial midplane of the bushing. The axes 40*a*, 42*a* are located on either side of the axis 25 of the outer surface 24*a* of the bushing. The radii R40 and R42 of the cylinder portions 40, 42 are equal. The axes 44*a*, 46*a* are different from the axes 40*a*, 42*a*. The axes 44*a*, 46*a* are located in the axial midplane of the bushing. The axes 44*a*, 46*a* are located on either side of the axis 25. The radii R44 and R46 of the cylinder portions 44, 46 are equal and less than the radii R40 and R42.

The first and second ends of each of the first and second first cylinder portions 40, 42 delimit the respective first cylinder portions in the circumferential direction.

Each of the second cylinder portion 44, 46 is circumferentially connected on one side to the first first first cylinder portion 40 and is circumferentially connected on the other side to the second first cylinder portion 42. Each of the second cylinder portions 44, 46 connects to the first cylinder portions 40, 42 without a drop-off.

In a sectional view, the annular inner surface 24*b* of the bushing has two axes X1, X2 of orthogonal symmetry. The annular inner surface 24*b* has, in a sectional view, an oval shape.

In the illustrated embodiments, the first ring 12 of the bearing is the inner ring and the second ring 14, onto which the insulating insert 26 is overmolded, is the outer ring.

Alternatively, a reverse arrangement can be provided whereby the second ring 14, onto which the insulating insert 26 is overmolded, is the inner ring. In this case, the insulating sleeve is located in the bore 12*a* of the inner ring. The insulating insert is then radially interposed between the bore 12*a* of the inner ring and the outer surface of the bushing. The insulating insert is overmolded onto the inner ring and at least onto the outer surface of the bushing. The outer surface of the bushing assumes a non-cylindrical annular shape. The bore of the bushing delimits the bore of the bearing device.

In the described embodiments, the bearing of the device is provided with a single row of rolling elements. As a variant, the bearing can be provided with several rows of rolling elements. In addition, the rolling bearing can include types of rolling elements other than balls, for example, rollers. In another variant, the bearing can be a slider bearing devoid of rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electrically insulated bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:

a bearing including a first ring and a second ring configured to rotate relative to each other relative to a central axis, the second ring having a first cylindrical surface and a second cylindrical surface radially spaced from the first cylindrical surface, a bushing having a first axial end and a second axial end and an axial length from the first axial end to the second axial end and having a first radial surface and a second radial surface radially spaced from the first radial surface of the bushing, and an electrically insulating insert overmolded between and connecting the first radial surface of the bushing and the second cylindrical surface of the second ring, wherein the first radial surface of the bushing is curved but does not lie on a single cylinder.

2. The bearing device according to claim 1, wherein the first radial surface of the bushing has, in a sectional view, exactly two axes of orthogonal symmetry.

3. The bearing device according to claim 2, wherein the first radial surface of the bushing has an oblong shape in a sectional view.

4. The bearing device according to claim 3, wherein the first radial surface of the bushing has a first first cylindrical portion lying on a first cylinder having a first longitudinal axis and a first second cylindrical portion lying on a second cylinder having a second cylindrical axis spaced from the first cylindrical axis.

5. The bearing device according to claim 4, wherein the first radial surface of the bushing has a first planar portion connecting a first circumferential end of the first first cylindrical portion to a first circumferential end of the second first cylindrical portion and a second planar portion connecting a second circumferential end of the first first cylindrical portion to a second circumferential end of the second first cylindrical portion.

6. The bearing device according to claim 5, wherein the first first cylindrical portion is a first half cylinder and the second first cylindrical portion is a second half cylinder.

7. The bearing device according to claim 4, wherein the first radial surface of the bushing has a first second cylindrical portion connecting a first circumferential end of the first first cylindrical portion portion to a first circumferential end of the second first cylindrical portion, the first second cylindrical portion lying on a third cylinder having a third axis spaced from the first axis and from the second axis.

8. The bearing device according to claim 7, wherein the radial surface has a second second cylindrical portion connecting a second circumferential end of the first first cylindrical portion to a second circumferential end of the second first cylindrical portion, the second second cylindrical portion lying on a fourth cylinder having a fourth axis spaced from the first axis and from the second axis and from the third axis.

9. The bearing device according to claim 8, wherein the first axis, the second axis, the third axis and the fourth axis all lie in a midplane of the bushing.

10. The bearing device according to claim 9, wherein the first axis and the second axis are the same and are located on a midplane of the bushing between the third axis and the fourth axis.

11. An electric motor comprising:

a housing, a shaft, and at least one bearing device according to claim 10 mounted radially between the housing and the shaft.

12. The bearing device according to claim 1, wherein the first radial surface of the bushing has an oval shape in a sectional view.

13. The bearing device according to claim 1, wherein the bushing is made of metal.

14. An electric motor comprising:

a housing, a shaft, and at least one bearing device according to claim 1 mounted radially between the housing and the shaft.

* * * * *